Aug. 6, 1968 H. J. LUNDBERG 3,395,862
TRACTION MEANS FOR VEHICLE WHEELS
Filed July 18, 1966
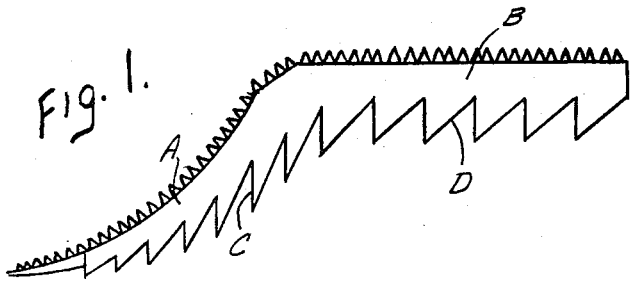
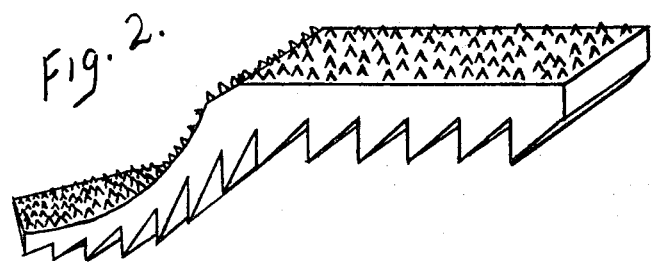
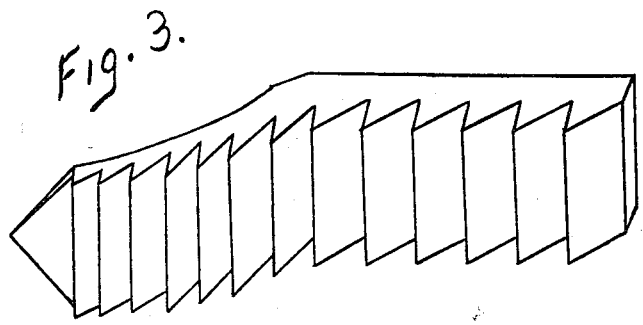
HERBERT JOHN LUNDBERG
INVENTOR.

3,395,862
TRACTION MEANS FOR VEHICLE WHEELS
Herbert John Lundberg, 175 Van Nostrand Ave.,
Jersey City, N.J. 07305
Filed July 18, 1966, Ser. No. 566,447
3 Claims. (Cl. 238—14)

ABSTRACT OF THE DISCLOSURE

A vehicle wheel traction device which has a body of rigid material with a curved portion and a flat portion rigidly connected to each other. A top surface of the body is roughened while a bottom surface of the body is provided with ridge shaped teeth for gripping into the surface on which said wheel travels.

---

This invention relates to a specially designed traction-causing platform or device that, when engaged between a vehicle wheel and a formally tractionless surface, provides traction and thus enables the wheel to move the vehicle. This is accomplished by means of specially designed traction causing surfaces on both the upper and lower surfaces of the traction-causing device. This enables the wheel to find traction on the upper surface of the traction-causing device and the ensuing pulling power is then transmitted to the bottom surface of the traction-causing device which is designed to grip or penetrate into the formally tractionless surface and this provide traction which is then transmitted back to the vehicle wheel. An example would be an automobile wheel unable to move in sand, snow, mud, ice, or what have you. As so often is the case in such a predicament, defeat is only recognized after the wheel has made a considerable hole in the tractionless surface. For this reason, primarily, this traction-causing device is designed in part to take on the shape and angle of said hole and in so doing conform as well to the similar shape of the vehicle wheel, thus providing maximum traction causing surface area contact between all the traction-causing elements involved. Additionally, with the remaining portion of the traction-causing device extending horizontally back and over the edge of the hole the possibility of the device being pulled under the wheel beyond the desired position by the turning action of the wheel, is greatly reduced, since the traction-causing device's construction is rigid at this area and thus obstructs any attempt by the wheel to pull it under by virtue of its opposing angle.

It is the principal object of this invention to provide an inexpensive, specialized tool to aid in freeing a vehicle from such as sand traps, snow banks, mud holes, icey surfaces, and the like. Presently there is no specialized tool to do this job, short of a tow truck. This modern age has produced many aids to man yet, as with the widely used automobile, we are still so ill-equipped to do this particular function. I think we can all remember that one time at least when we were stranded somewhere and found ourselves searching high and low for some piece of wood or anything that could be found to force under the wheels in a so often vain attempt to free the automobile, with some frustrating digging thrown in to boot.

Additional objects and advantages of the invention will become apparent during the course of the following specification when taken in connection with the accompanying drawings, in which:

FIG. 1 is a side view of the traction-causing device.
FIG. 2 is a view of the traction-causing device showing the irregularly contoured top surface specifically designed to cause improved traction when engaged with a vehicle wheel.
FIG. 3 is a view of the traction-causing device showing irregularly contoured bottom surface specifically designed to produce improved traction on such tractionless surfaces as sand, snow, mud, ice, and the like, having strong, deep penetrating "teeth" designed to grip or penetrate down into the tractionless surface and provide a stationary platform, as it were, on which the vehicle wheel can ascend.

It must also be noted that the front of the application end of the traction-causing device is tapered to a fine and narrow point to provide easier penetration when it might become necessary to force the traction-causing device under the vehicle wheel to begin the traction, such as on a smooth icey surface, said teeth having a vertical flank C and a slanted flank D said teeth increasing in length from said curved portion A toward said flat shaped portion B. For this same purpose the front area is void of teeth on its bottom side, this allows the turning vehicle wheel to pull the traction-causing device under it to a point where the teeth are encountered and before they take a firm hold in the surface beneath. This insures the fact that there will be a sufficient area of contact to provide the needed traction.

Any of several materials could be employed in the making of this traction-causing device, solid plastic being perhaps the most inexpensive since one mold would be all that was required, and with no fabrication or assembly work involved a very inexpensive product should result, having a concave shaped or permanently curved portion A extending downwardly and away from a flat shaped portion B, said portions A and B being rigidly connected to each other.

While a preferred embodiment of the invention has been shown and described herein, it is obvious that numerous omissions, changes and additions may be made in such embodiment without departing from the spirit and scope of the invention.

What I claim is:
1. In a vehicle traction device having a body with a tapered tip, said tip having a smooth undersurface adapted to be placed under a vehicle wheel said body having a contoured upper and lower surface, the improvement comprising:
   (a) a rigid flat portion,
   (b) a rigid curved portion the upper surface of the curved portion being concave relative to said upper surface,
   (c) said two rigid portions being rigidly connected to each other to form a unitary body of rigid construction, and
   (d) said contoured lower surface including gripping teeth.
2. The vehicle wheel traction device according to claim 1, wherein said flat and curved portions for an angle of about 45° between each other.
3. The vehicle wheel traction device according to claim 1, wherein said flat and curved portions form an angle of said lower surface and having a substantially vertical flank facing toward said curved portion and a slanted flank facing away from said curved portion, said teeth increasing in length from said curved portion toward said flat portion.

References Cited

UNITED STATES PATENTS

| | | | |
|---|---|---|---|
| 1,324,291 | 11/1919 | Austen | 238—14 |
| 1,425,101 | 8/1922 | Jury | 238—14 |
| 1,617,271 | 2/1927 | Penfield | 238—14 |
| 1,815,435 | 7/1931 | Harding et al. | 238—14 |
| 1,863,316 | 6/1932 | Webster | 238—14 |
| 2,479,760 | 8/1949 | Merrick | 238—14 |
| 2,532,149 | 11/1950 | Cone | 238—14 |
| 2,975,977 | 3/1961 | Chodacki et al. | 238—14 |

FOREIGN PATENTS 198,146  6/1959  Germany.

ARTHUR L. LA POINT, *Primary Examiner.*

R. A. BERTSCH, *Assistant Examiner.*